United States Patent [19]

Stiles

[11] 4,061,043

[45] Dec. 6, 1977

[54] ELECTROSTATIC RATE GYROSCOPE

[76] Inventor: John Callender Stiles, 10 Abingdon St., Morris Plains, N.J. 07950

[21] Appl. No.: 671,257

[22] Filed: Mar. 29, 1976

[51] Int. Cl.² ............................................. G01C 19/28
[52] U.S. Cl. .................................. 74/5.6 D; 74/5 R;
74/5.8; 74/5.42; 308/10; 73/517 B; 310/309
[58] Field of Search ..................... 74/5, 5 R, 5 F, 5.1,
74/5.37, 5.4, 5.41, 5.42, 5.5, 5.6 A, 5.6 B, 5.6 C,
5.6 D, 5.6 E, 5.6 R, 5.7

[56] References Cited

U.S. PATENT DOCUMENTS

3,902,374  9/1975  Hoffman et al. ................... 74/5.6 D

*Primary Examiner*—Samuel Scott
*Assistant Examiner*—Don E. Ferrell

[57] ABSTRACT

A two-axis rate gyroscope of the captured type is provided having a cylindrical rotor with one or more inwardly projecting flanges. The rotor is disposed within a sealed toroidal cavity in a rotor housing and the interior of the cavity is evacuated to a "hard" vacuum. An electrostatic suspension system restrains the rotor from translatory movement along the gyroscope spin axis and two axes perpendicular thereto so that a virtually frictionless spin bearing is provided for the rotor. The suspension system functions to prevent relative angular rotation between the rotor and the rotor housing about two precession axes. The rotor housing is mounted on a flexure joint which prevents translatory movement of the housing along three orthogonal axes but permits rotational movement of the housing about the two precession axes. Vibrating beam force transducer means exert a reaction force on the housing which prevents rotation of the housing about the two precession axes in response to input rates applied to the gyroscope, so that the electrical output signals of the transducer means are a function of the input rates applied to the gyroscope. The rotor housing, flexure joint, rotor and vibrating beam force transducers are disposed within a sealed casing which may be evacuated separately from the toroidal cavity within the rotor housing, so that the toroidal cavity may be easily evacuated to the higher degree of vacuum required for a frictionless rotor spin bearing. The cylindrical rotor structure permits the use of a simplified electrostatic suspension system in which the suspension electrodes also function as rotor displacement sensing electrodes.

16 Claims, 5 Drawing Figures

ELECTROSTATIC RATE GYROSCOPE

BACKGROUND OF THE INVENTION

1. Field of the Invention

This invention relates to inertial sensing devices and the like and more particularly to a two-axis electrostatic rate gyroscope of the captured type.

2. Description of the Prior Art

Gyroscopes are customarily employed in inertial navigation and guidance systems to provide one or more fixed reference attitudes or positions about one or more axes, so that the attitude or rate of change of attitude of the vehicle in which the inertial system is mounted may be measured or sensed with respect to the fixed reference attitude. In a gyroscope of the "captured" type, the angular rotation of the spin axis of the rotor about the precession axis or axes in response to an input rate from the vehicle is restrained by a torquing or capture system which maintains the rotor in a centered or "null" position and the magnitude and direction of the restraining torque are sensed by force transducer means to obtain the vehicle attitude or rate of change of attitude as the case may be.

Present day inertial navigation and guidance systems impose high accuracy requirements upon the gyroscopes employed in the systems. In particular, a large dynamic range is desired. The dynamic range of a gyroscope is generally defined as the ratio of maximum measurable rate to the accuracy of that measurement. A satisfactory dynamic range for modern applications would be of the order of $10^8$ to 1. In addition to a large dynamic range, a suitable gyroscope for inertial systems should produce variable frequency output signals which may easily be processed into digital form for use with the digital information handling and processing techniques employed in modern system technology. A suitable gyroscope should also have a mechanically rugged, yet simple, construction which facilitates manufacture, maintenance and repair of the instrument.

One solution to the problem of providing a gyroscope having the aforementioned characteristics would involve the mounting of a gyroscope rotor and housing on a flexure joint having two degrees of rotational freedom corresponding to the two precession axes of the gyroscope and employing vibrating beam force transducers to restrain rotation of the rotor and housing about the two precession axes. Suspension and capture systems would suspend the rotor for rotation within the housing and "capture" the rotor with respect to the housing, so that the restraining force or torque exerted by the force transducers on the housing would be a measure of the input rate to the gyroscope. Since the vibrating beam type of force transducer produces an output signal having a variable frequency which is a function of the mechanical stress produced in the transducer by the force being sensed, the variable output frequency will be a function of the input rate applied to the gyroscope. Although this solution appears to be expedient, it presents difficulties of its own. The two-degree-of-freedom flexure joint on which the glyroscope rotor and housing assembly is mounted generally comprises a shaft or elongated support member having a "necked-down" section of gradually decreasing cross-sectional area which restrains the rotor and housing assembly against translatory movement along three orthogonal gyroscope axes but permits rotational movement about two of the axes. Since the vibrating beam force transducers should operate in a vacuum, the gyroscope casing is usually evacuated with the result that the heat flow between different sections of the gyroscope is largely by conduction rather than convection or radiation. Since the cross-sectional area of the flexure joint is small, the heat flowing by conduction through that section is limited, so that large thermal gradients and thermal distortions can be produced in the gyroscope to cause substantial errors in the output of the vibrating beam force transducers. A second difficulty with the proposed solution involves the high sensitivity of this apparatus to effects of vibration, shock and acceleration. Since the gyroscope rotor and housing assembly is restrained from rotation about the precession axes by the vibrating beam force transducers, it is important that the rotor should have as small a mass as possible, so that it will be supported entirely by the aforementioned flexure joint and the weight of the rotor itself will not cause spurious outputs from the vibrating beam force transducers.

Some of the aforementioned difficulties have been met by the development of electrostatic rate gyroscopes in which a hollow spherical rotor is electrostatically suspended in the gyroscope housing and an electrostatic capture system is utilized to null the rotor with respect to the housing. In this arrangement, however, if the spherical rotor is made of relatively thin material to keep the rotor mass as low as possible, the rotor will tend to deform at high spin speeds because of the action of the high centrifugal forces involved. Since the accuracy of the spherical rotor type of electrostatic gyroscope depends to a large extent upon the sphericity of the rotor, the spin speeds of these gyroscopes are therefore kept within reasonble limits to prevent this centrifugal deformation. The aforementioned limitation on spin speeds limits the ratio of angular momentum to weight and therefore increases the weight which must be supported by the flexure joint. Accordingly, the limitation on spin speeds with the attendant limitation on weight reduction will produce a structure which is limited in its ability to be free from errors produced by vibration, shock and acceleration. Furthermore, for maximum operating efficiency, the electrostatic suspension system for the spherical rotor type of electrostatic gyroscope must be highly accurate in operation. The suspension electrodes must be so designed and located that spurious drag torques are not applied to the spherical rotor which would produce spurious outputs and gyroscope inaccuracy.

SUMMARY OF THE INVENTION

It is an object of this invention to provide an electrostatic rate gyroscope of the captured type which has the high dynamic range requirements and operating accuracy required for use in modern inertial navigation and guidance systems.

It is a further object of this invention to provide an electrostatic rate gyroscope of the captured type which exhibits a low degree of sensitivity to the effects of vibration, shock and acceleration and which is mechanically rugged in construction and easily manufactured and maintained.

It is a still further object of this invention to provide an electrostatic rate gyroscope of the captured type which utilizes a novel cylindrical rotor construction which permits the use of substantially higher spin speeds and minimizes power requirements.

It is another object of this invention to provide an electrostatic rate gyroscope of the captured type in which a novel electrostatic suspension system of simplified construction is employed to suspend a cylindrical rotor in a rotor housing.

It is an additional object of this invention to provide an electrostatic rate gyroscope of the captured type having vibrating beam force transducers in which the gyroscope rotor is electrostatically supported in a sealed, evacuable cavity which is separate from the sealed, evacuable instrument cavity in which the force transducers are mounted, so that each of the cavities may be evacuated to a different degree of vacuum to facilitate manufacture and maintenance of the instrument and minimize thermal distortion problems.

It is still another object of this invention to provide an electrostatic rate gyroscope of the captured type having a novel electrostatic rotor suspension system in which the suspension electrodes also function as rotor displacement sensing electrodes.

Briefly, the gyroscope of the present invention comprises a rotor housing having a toroidal cavity therein concentrically disposed about the gyroscope spin axis and a rotor having a cylindrical body portion with inwardly projecting flange means thereon concentrically disposed within the cavity about the spin axis. Mounting means are provided for mounting the rotor housing to permit rotation thereof about at least one precession axis and electrostatic suspension means are utilized to suspend the rotor within the toroidal cavity to permit rotor rotation about the spin axis and to prevent relative angular rotation between the housing and the rotor about the precession axis, so that the housing rotates with the rotor about the precession axis in response to an input rate applied to the input axis of the gyroscope. Force transducer means of the vibrating beam type are coupled to the housing to exert a force on the housing to prevent rotation thereof about the precession axis and to produce an output signal in response to the force exerted, so that the output signal is responsive to the applied input rate to the gyroscope.

A sealed, evacuable casing is provided to enclose the gyroscope components so that the vibrating beam force transducers may operate in the desired degree of vacuum. The toroidal cavity in which the rotor is disposed is also sealed and may be evacuated separately to the higher degree of vacuum required for the electrostatic suspension system. The electrostatic suspension system comprises three sets of radially disposed suspension electrodes located on the housing cavity walls. The first electrode set is located on the cavity wall adjacent one side of the rotor flange means and the second set is located on the cavity wall adjacent the other side of the flange means in radial alignment with the electrodes of the first set so that the electrodes of the second set cooperate with the electrodes of the first set to form radially disposed electrode pairs which control translatory movement of the rotor along the spin axis and relative angular rotation between the housing and the rotor about two perpendicular axes which are each perpendicular to the spin axis. The third set of electrodes are located on the cavity wall adjacent the rotor body portion and cooperate with each other to form radially disposed electrode pairs in which the electrodes of each pair are located on diametrically opposite sides of the rotor so that the third set of electrodes controls translatory movement of the rotor along the two perpendicular axes. A separate rotor displacement sensing circuit is provided for each of the radially disposed electrode pairs and permits the suspension electrodes to also function as the rotor displacement sensing electrodes.

The nature of the invention and other objects and additional advantages thereof will be more readily understood by those skilled in the art after consideration of the following detailed description taken in conjunction with the accompanying drawings.

DESCRIPTION OF THE PREFERRED EMBODIMENT OF THE INVENTION

Figure 1:
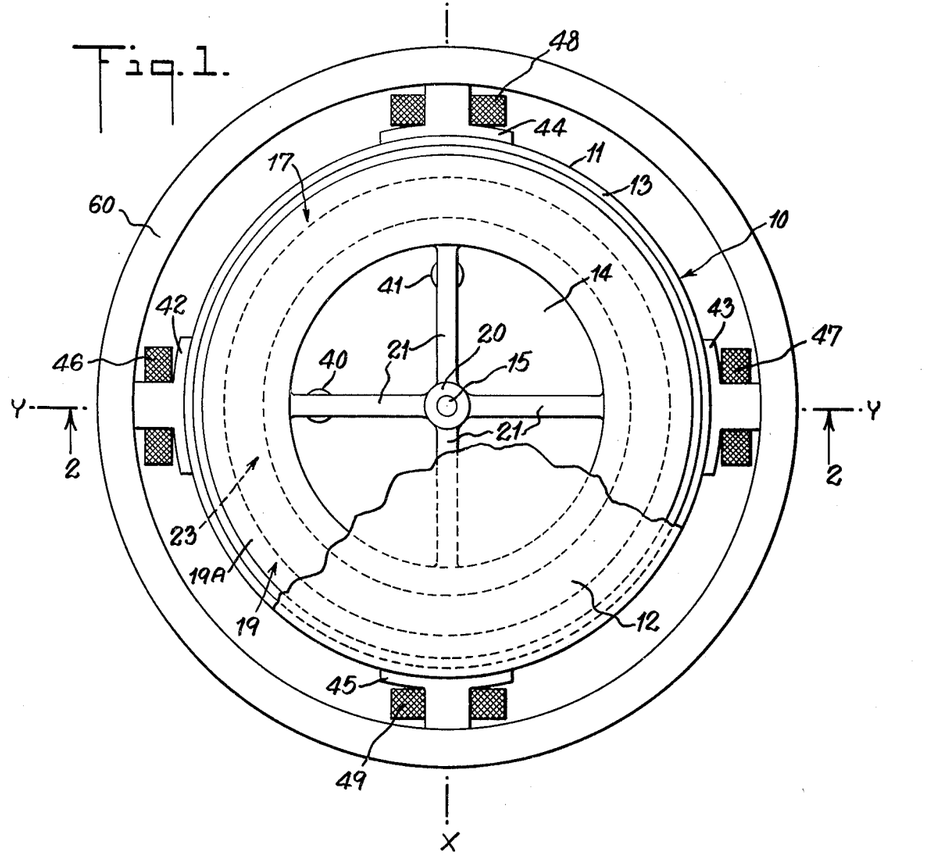
FIG. 1 is a top plan view of a two-axis, electrostatic rate gyroscope constructed in accordance with the teachings of the present invention with a portion of the casing of the instrument broken away to reveal details of construction.
Figure 2:
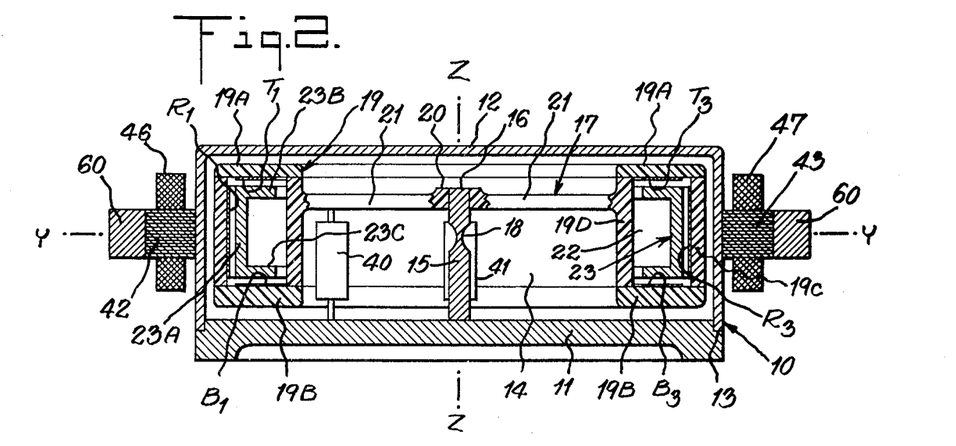
FIG. 2 is a full sectional view of the gyroscope taken along the Y—Y axis in the direction of the arrows 2—2 in FIG. 1 of the drawings.

Referring now to FIGS. 1 and 2 of the drawings, there is shown a two-axis rate gyroscope constructed in accordance with the teachings of the present invention. The gyroscope has an instrument casing 10 which consists of a circular base member 11 and a cylindrical cover 12. The base member 11 has an annular cut or shoulder 13 formed about its periphery which receives the cylindrical cover 12 to produce a sealed interior space or cavity 14 which is capable of being evacuated by known techniques through an aperture or apertures (not shown) formed in the casing. An elongated support member or rod 15 is disposed along the spin axis Z—Z of the gyroscope and has one end thereof fixedly secured to the base member 11. The other end 16 of the support rod has fixedly mounted upon it a cylindrical rotor housing indicated generally as 17 which is disposed in the X—Y plane as seen in FIGS. 1 and 2 of the drawings. The support rod 15 is provided with a necked-down portion 18 having a circular cross-sectional area of gradually reducing size which acts as a flexure joint to permit rotational movement of the housing 17 about the X and Y precession axes and prevent translatory movement of the housing along the X, Y and Z axes. Since the rotor housing 17 is fixedly secured to the end 16 of the mounting means or rod 15, the flexure joint also prevents rotational movement of the rotor housing about the spin axis Z of the gyroscope. The flexure joint 18 and the rotor housing 17 are so designed that the center of gravity of the rotor housing structure lies in the necked-down area of the joint to thereby eliminate spurious torques on the rotor housing produced by forces such as acceleration and the like.

The rotor housing 17 comprises a substantially toroidal-shaped outer member indicated generally as 19 which is connected to a central mounting hub 20 by a plurality of supporting arms 21. The outer member 19 of the rotor housing 17 has a substantially toroidal-shaped cavity 22 formed therein which is concentrically disposed about the gyroscope spin axis Z. In the illustrated embodiment of the invention, the outer member 19 of the rotor housing is formed by an annular top member 19A, an annular bottom member 19B, a cylindrical outer member 19C and a cylindrical inner member 19D to which the support arms 21 are affixed. Accordingly, the toroidal cavity 22 is produced by the horizontal inner surfaces or walls of the members 19A and 19B and the vertical inner surfaces or walls of the members 19C and 19D. Although the cross-section of the toroidal cavity illustrated herein is shown as a rectangle, it will be understood that one or more of the walls defining the cavity would be curved or the cavity cross-section could take the form of other geometric configurations. Accordingly, the term "toroidal" as used herein shall be deemed to define the surface or cavity produced by the rotation of a closed plane geometric figure about an axis of rotation. A rotor, indicated generally as 23, is disposed within the toroidal cavity 22 and is arranged for rotation about the spin axis Z of the gyroscope. As illustrated, the rotor 23 is substantially C-shaped and has a cylindrical body portion 23A, an annular, inwardly-extending top flange portion 23B and an annular, inwardly-extending bottom flange portion 23C.

Figure 3:
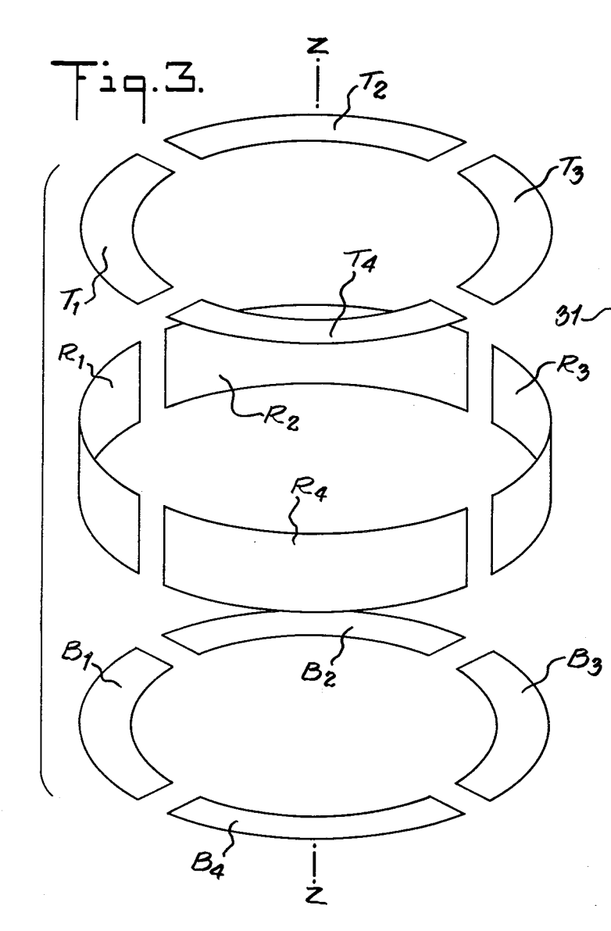
FIG. 3 is an exploded perspective view of the suspension electrodes employed in the electrostatic suspension system for the gyroscope of FIG. 1.

The cylindrical rotor 23 is suspended or levitated within the toroidal cavity 22 in the rotor housing 17 by means of an electrostatic suspension system which is shown in FIGS. 2 and 3 of the drawings. The suspension system consists of a first set of four, radially disposed, suspension electrodes $T_1$, $T_2$, $T_3$, and $T_4$ which are located on the cavity wall defined by the inner surface of the top member 19A of the rotor housing. The electrodes have a quadrantal relationship such that the geometric center of electrode $T_1$ is diametrically opposite from the geometric center of electrode $T_3$ on the Y axis and the geometric centers of electrodes $T_2$ and $T_4$ are similarly diametrically opposed on the X axis. The electrodes of the first set are located on one side of the rotor flange means. In a similar fashion, a second set of four, radially disposed, suspension electrodes $B_1$, $B_2$, $B_3$, and $B_4$ are located on the inner surface of the bottom member 19B of the rotor housing in radial alignment with the electrodes of the first set. Accordingly, the electrodes of the second set are located on the other side of the rotor flange means and cooperate with the electrodes of the first set to form four radially disposed electrode pairs lying on the X and Y axes. As will be explained hereinafter, it is not necessary that the alignment axes of these electrode pairs be coincident with the X and Y precession axes of the gyroscope, since the only function of these electrodes is to keep the rotor 23 aligned in the X—Y plane. A third set of four, radially disposed, suspension electrodes $R_1$, $R_2$, $R_3$ and $R_4$ are located on the cylindrical inner surface of rotor housing member 19C adjacent the rotor body portion 23A. Electrodes $R_1$ and $R_3$ are diametrically opposed on opposite sides of the rotor 23 on an alignment axis which is perpendicular to the alignment axis for electrodes $R_2$ and $R_4$ which are similarly diametrically opposed on opposite sides of the rotor. Electrodes $R_1$ and $R_3$ form a first pair of electrodes and electrodes $R_2$ and $R_4$ form a second pair of electrodes. The electrode pairs of the third set are also radially disposed on two perpendicular alignment axes which may or may not coincide with the gyroscope X-Y axes. These electrodes control translatory movement of the rotor along the X and Y axes.

In practice, the three sets of electrodes T, R and B may comprise separate metallic sheets or plates which are secured by means, such as cementing, for example, to the inside surfaces of the rotor housing elements 19A, 19B and 19C. Alternatively, these electrodes may be formed on the surfaces of the rotor housing elements by means such as electrodeposition, for example. In any event, the rotor housing elements 19A, 19B, 19C and 19D should be fabricated of a strong, yet lightweight material, which is electrically non-conductive. For example, these elements may be conveniently fabricated of fiber glass or one of the newer ceramic materials. Whatever materials are employed, however, the toroidal cavity should be sealed and be capable of being evacuated to a "hard" vacuum. The rotor 23 may be made entirely of an electrically conductive material, such as beryllium, for example, which is strong and light in weight. Alternatively, the rotor 23 may be formed of a non-conductive material, such as boron with an epoxy binder, for example, and the surfaces of the rotor opposite the suspension electrodes may be provided with a metallic plating by one or more well known means, such as electrodeposition, for example. As will be explained hereinafter, the rotor 23 is brought up to spin speed by an external magnetic drive which induces eddy currents in the rotor. Accordingly, if it is desired that the rotor be brought up to maximum spin speed as quickly as possible, the entire rotor should be formed of a metallic material to permit the maximum induction of eddy currents. If a lower spin-up rate is acceptable, only the exterior surface of the rotor need be made of electrically conductive material. Since the latter construction would permit the use of the lighter weight materials, such as the boron-epoxy composition previously mentioned, the rotor itself would be of lighter weight and a higher spin speed could be employed, at the sacrifice, however, of a lower spin-up rate. Conversely, if a lower spin speed is acceptable, a heavier weight rotor of electrically conductive material could be employed to maximize the spin-up rate.

When the toroidal cavity 22 is evacuated to a "hard" vacuum to prevent arcing between the three sets of suspension electrodes and the suspension electrodes are suitably energized, an electrostatic force will be set up between each of the twelve electrodes and the opposing surface of the rotor 23. As seen in FIG. 3 of the drawings, translatory movement of the rotor 23 along the Z spin axis is controlled by the electrostatic forces exerted by the suspension electrodes $T_1$ through $T_4$ on the surface of flange 23B of the rotor and by the electrostatic forces exerted by the suspension electrodes $B_1$ through $B_4$ on the rotor flange 23C. In a similar fashion, translatory movement of the rotor along the Y axis of the gyroscope is controlled by the electrostatic forces exerted by electrodes $R_1$ and $R_3$ on the cylindrical rotor body portion 23A and translatory movement of the rotor along the X axis is controlled by the electrostatic forces exerted by electrodes $R_2$ and $R_4$ on the same rotor portion. It will also be apparent that the disclosed electrode arrangement permits the rotor to spin freely about the spin axis Z when it is properly levitated within the toroidal cavity 22. Since the cavity is evacuated to a high degree of vacuum, the absence of air friction permits the highest possible spin speeds. The absence of air friction also means that a smaller amount of power will be required to bring the rotor up to operating spin speed and that once the required spin speed is reached, it will decay very slowly, so that the spin-up power need only be applied intermittently to the rotor to insure that the spin speed is kept within acceptable operating limits.

With the electrodes arranged as shown in FIG. 3 of the drawings, it is apparent that the electrostatic forces exerted by the electrode pair $T_1$ and $B_1$ on one diametric side of the rotor and the electrostatic forces exerted by the electrode pair $T_3$ and $B_3$ on the other diametric side of the rotor, will control the rotation of the rotor about the X precession axis. In a similar fashion, the suspension electrode pair $T_2$ and $B_2$ and the electrode pair $T_4$ and $B_4$ control rotation of the rotor about the Y precession axis. Accordingly, the electrostatic suspension electrodes function to restrain translatory movement of the rotor 23 along the X, Y and Z axes of the gyroscope, restrain rotation of the rotor about the X and Y precession axes and permit free rotation of the rotor about the Z spin axis of the gyroscope.

Figure 4:
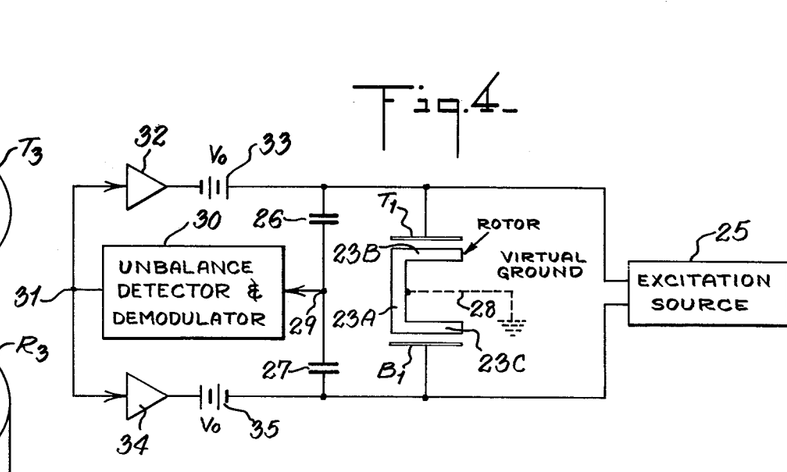
FIG. 4 is a schematic circuit diagram of the rotor displacement sensing circuit for one pair of the suspension electrodes of the electrostatic suspension system of the gyroscope.

The circuit means for sensing rotor displacement and controlling the suspension electrodes is shown in FIG. 4 of the drawings. The suspension electrode arrangement thus far described permits a separate rotor displacement sensing circuit of simplified construction to be utilized for each of the radially disposed electrode pairs. Accordingly, the displacement sensing circuit which is shown in FIG. 4 of the drawings as being coupled to the electrode pair consisting of the $T_1$ and $B_1$ electrodes may be employed for each of the other electrode pairs. For example, displacement sensing circuits having the identical construction would be used for the $T_3$ and $B_3$ pair, the $T_2$ and $B_2$ pair, the $T_4$ and $B_4$ pair, the $R_1$ and $R_3$ pair and the $R_2$ and $R_4$ pair. As seen in FIG. 4, a source 25 of AC excitation voltage is applied across suspension electrodes $T_1$ and $B_1$ so that a capacitance exists between electrode $T_1$ and the top flange 23B of the rotor. A similar capacitance is formed between electrode $B_1$ and the bottom rotor flange 23C. These two capacitances are connected in series circuit by the rotor body portion 23A. Fixed capacitors 26 and 27 are connected together in a series circuit which is connected in parallel with the serially-connected capacitances formed by the rotor and the suspension electrodes $T_1$ and $B_1$. If the potential of the rotor is held at ground potential, as hereinafter explained, a virtual ground 28 will exist at the rotor as shown schematically in the drawings, so that an alternating current capacitance bridge circuit will be formed by the two fixed capacitors 26 and 27 and the variable capacitances formed by the suspension electrodes $T_1$ and $B_1$ and the gyroscope rotor. The bridge detector circuit will be energized by the AC source 25 and an AC output signal will appear between the virtual ground 28 and the circuit junction point 29 of the serially-connected fixed capacitors. Since the physical distance between the suspension electrode $T_1$ and the top rotor flange 23B will determine the value of the capacitance formed by that combination and the distance between the suspension electrode $B_1$ and the bottom rotor flange 23C will determine the value of the capacitance of that combination, it is apparent that the AC output signal from the bridge circuit is an amplitude modulated signal having an amplitude and phase respectively representing the magnitude and direction of the rotor displacement from a centered or null position between the electrodes.

The AC output signal from the bridge appearing at circuit junction point 29 is applied to an unbalance detector and demodulator 30 which, in a well known manner, will demodulate the AC error signal from the bridge and produce a DC output voltage which is proportional to the rotor displacement. The DC signal appearing at the output 31 of the unbalance detector and demodulator 30 is applied through a serially-connected amplifier 32 and a source 33 of DC bias voltage to the suspension electrode $T_1$. In a similar fashion, the output 31 of the demodulator is also connected through a serially-connected amplifier 34 and a source 35 of DC bias voltage of opposite polarity to the suspension electrode $B_1$. If the rotor is not centered between the electrodes $T_1$ and $B_1$, the capacitance bridge and unbalance detector 30 will produce a DC voltage V having a magnitude and polarity representing the magnitude and direction of the displacement. With a bias voltage of $V_O$ and with the polarities of the bias voltage sources illustrated, the voltage $V_{ET}$ appearing at suspension electrode $T_1$ would be $$V_{ET} = V + V_O, \qquad (1)$$

and the voltage $V_{EB}$ appearing at the suspension electrode $B_1$ would be $$V_{EB} = V - V_O. \qquad (2)$$

The net force F which is exerted on the rotor by the electrodes is proportional to the difference between the squares of the electrode voltages $V_{ET}$ and $V_{EB}$, so that $$F \sim (V + V_O)^2 - (V - V_O)^2 = 4V V_O. \qquad (3)$$

Accordingly, it is seen that the resulting force F which is produced on the rotor by the DC control voltages applied to the suspension electrodes $T_1$ and $B_1$ is proportional to the displacement of the rotor with respect to these electrodes and is in the proper direction to return the rotor to a centered or null position.

It will be noted that in the gyroscope of the invention, each pair of suspension electrodes function not only as the control electrodes which physically position the rotor but also function as the displacement sensing electrodes which sense the position of the rotor with respect to the pair of electrodes. This arrangement avoids the use of a separate set of displacement sensing electrodes and greatly simplifies the overall suspension system. In any electrostatic suspension system, however, it is important that the rotor itself be maintained at zero potential to avoid the generation of spurious electrostatic forces which could force the rotor out of its centered or nulled position. This may easily be accomplished by a number of known techniques. For example, a single, common AC excitation source 25 may be utilized to energize all of the six pairs of suspension electrodes, but the excitation voltage applied to each pair from the single source could be shifted in phase by known phase shifting circuits, so that the net AC current supplied to the rotor is zero. Alternatively, a circuit which generates a rotor voltage compensation component could be employed as described in U.S. Pat. application Ser. No. 408,195 of Jay Hoffman et al for "Electrostatic Rate Gyroscope" which is assigned to the assignee of the present invention. As a further alternative, each of the 12 suspension electrodes could be replaced by two separate suspension electrodes as taught in the aforesaid Patent Application. The two separate electrodes would have a total area which is approximately the same as the area of the single electrode which they replace. Each electrode half would be then energized from one side of a center-tapped secondary winding of an output signal transformer, so that the electrode control voltage applied to the primary winding of the transformer is divided into two output voltages which have the same form but which are 180° out-of-phase with respect to each other. With this arrangement, the induced rotor voltages which result from the suspension electrode input voltages will cancel out automatically for each electrode and the net residual voltage of the rotor will be due solely to any inequality in area among the suspension electrodes. The electrostatic force applied by the suspension electrodes will be the same as if the electrodes were not split.

As thus far described, it is seen that the electrostatic suspension system for the rotor will tend to keep the rotor centered or levitated with respect to the walls of the toroidal cavity 22 in the rotor housing 17. Since the rotor housing 17 is restrained by the flexure joint 18 from translatory movement along the X, Y and Z axes, the gyroscope rotor 23 will also be restrained from translatory movement along these three axes. However, when an input rate is applied to the gyroscope, the rotor will tend to precess about one or both of the precession axes X and Y. Since the electrostatic suspension system also functions to keep the rotor centered or nulled with respect to rotational movements about the X and Y axes, the system will prevent relative angular rotation between the rotor housing 17 and the rotor 23 about both of the precession axes, so that the housing 17 will tend to rotate with the rotor about one or both of the precession axes. As seen in FIGS. 1 and 2 of the drawings, a vibrating beam type of force transducer 40 is connected between the instrument casing base member 11 and one of the rotor housing support arms 21 on the Y axis, so that rotational movement of the rotor housing 17 about the X axis is prevented by the reaction force or torque exerted by the transducer means 40. In a similar fashion, a vibrating beam force transducer 41 is connected between the casing member 11 and one of the support arms 21 at a point on the X axis to prevent rotation of the rotor housing about the Y axis. The force transducer means 40 and 41 each produce an output signal which is a function of the mechanical stress produced in the force transducer by the reaction force or torque exerted by that transducer in restraining rotation of the rotor housing about either the X or Y axes. Consequently, since the rotor 23 is kept centered or nulled with respect to its position within the toroidal cavity 22 in the rotor housing and since the rotation of the rotor housing about the X and Y precession axes is restrained by the two force transducers 40 and 41, it is apparent that the rotor and rotor housing are captured, so that the restraining force or torque exerted by each of the force transducers is a function of the input rate applied to the gyroscope. Accordingly, the output signal of each force transducer will be a function of the input rate applied to the gyroscope on the input axis associated with the precession axis which the force transducer is adapted to sense.

The force transducers 40 and 41 are preferably of the vibrating beam type in which a resonator beam is mechanically connected between two elements to sense the force exerted between the two elements. In a manner well known in the art, the resonator beam produces an electric output signal having a frequency which varies as a function of the magnitude of the stress within the beam. The direction of frequency change above or below the natural resonant frequency of the resonator beam indicates whether the beam is placed in compression or tension and therefore indicates the direction of the force applied. The magnitude of the frequency shift is a function of the magnitude of the force applied. The operating characteristics and details of construction of vibrating beam force transducers of this type are discussed in U.S. Pat. Nos. 3,465,597 and 3,470,400 and will not be described further herein. The vibrating beam type of force transducer has the large dynamic range characteristic required for inertial navigation and guidance systems and produces a variable frequency output signal which may be easily converted to digital form by a number of well known techniques.

An externally generated rotating magnetic field is employed to bring the rotor 23 up to spin speed. As seen in FIGS. 1 and 2 of the drawings, the gyroscope is provided with a pole structure 42 and a pole structure 43 which are located on the Y axis of the gyroscope on opposite sides of the instrument casing. A second pair of pole structures 44 and 45 are disposed on the X axis on opposite sides of the instrument casing. An annular magnetic yoke structure 60 is arranged to magnetically interconnect each of the four pole structures 42 through 45 to provide a closed magnetic path which includes the rotor 23. Pole structure 42 is provided with a field winding 46 which is connected in series circuit by means (not shown) to a field winding 47 disposed on pole structure 43 and the serially-connected windings are energized by an AC source (not shown) at 0° phase. The pole structure 44 is provided with a field winding 48 which is serially connected with a field winding 49 on pole structure 45 across an AC source (not shown) at 90° phase. By virtue of this arrangement, the magnetic field produced by pole structures 42 and 43 and the magnetic field produced by pole structures 44 and 45 are 90° out of phase with respect to each other. As well known in the art, this arrangement produces a rotating magnetic field in the X—Y plane of the gyroscope which will induce eddy currents in the cylindrical rotor 23. The induced eddy currents in the rotor produce a torque which causes the rotor to rotate about the spin axis Z and build up to full spin speed.

The disclosed spin-up arrangement offers the advantage of being located completely outside of the evacuated gyroscope casing and does not interfere with rotor dynamics. As explained previously, since the toroidal cavity 22 is evacuated to a "hard" vacuum, the amount of torque required to bring the rotor up to full spin speed is extremely small. Once the rotor is brought up to spin speed, the virtually frictionless bearing provided by the electrostatic suspension system will permit the eddy current spin-up mechanism to be deenergized and the rotor will coast for a long period of time without a substantial decay in spin speed. This permits the spin torque for the rotor to be applied intermittently rather than continuously and results in a low power consumption for the gyroscope. In practice, the cylindrical casing cover 12 may be formed of a non-conducting, non-magnetic material, such as fiber glass or a ceramic, for example, to prevent induced eddy currents from flowing through the cover which would tend to diminish the eddy currents induced in the rotor itself.

Figure 5:
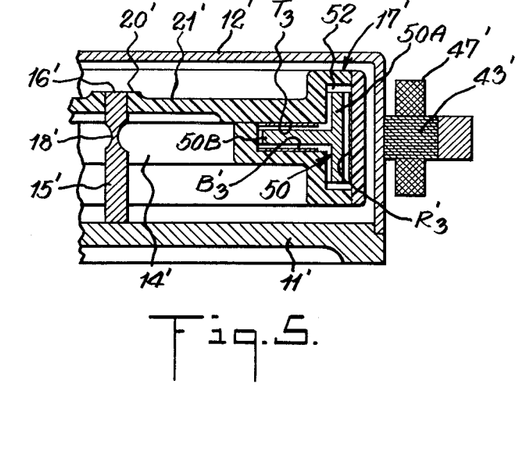
FIG. 5 is a partial vertical sectional view of the rotor housing, rotor and casing of a gyroscope having a modified rotor construction which constitutes an alternative embodiment of the invention.

A modified rotor construction is shown in FIG. 5 of the drawings which constitutes an alternative embodiment of the invention. In describing the embodiment of FIG. 5, reference numerals with a prime notation will be employed to designate components which are similar to or the same as components designated by the same reference numerals in the embodiment of FIGS. 1 through 4 of the drawings. As seen in FIG. 5, the gyroscope is provided with a T-shaped rotor 50 having a cylindrical body portion 50A and a single inwardly projecting flange 50B. The rotor 50 is disposed in a toroidal cavity 52 which is formed in the rotor housing 17'. The toroidal cavity 52 has a "T-shaped" cross-sectional area to accomodate the T-shaped rotor 50. The 12 suspension electrodes are disposed on the interior walls of the toroidal cavity 52 in the same manner as the corresponding suspension electrodes in the embodiment of FIGS. 1 through 4 of the drawings. The first set of suspension electrodes $T_1'$ through $T_4'$ cooperate with one side of the rotor flange 50B, while the second set of suspension electrodes $B_1'$ through $B_4'$ cooperate with the other side of the rotor flange 50B to control translatory movement of the rotor along the Z axis and rotational movement of the rotor about the X and Y precession axes. The $R_1'$ through $R_4'$ electrodes of the third set function in the same manner as the third set electrodes in the embodiment of FIGS. 1 through 4 of the drawings to restrain translatory movement of the rotor along the X and Y axes of the gyroscope. This embodiment of the invention utilizes a rotor configuration which is relatively easy to manufacture and which provides a rotor having a substantially smaller weight for a given electrode area, thereby making the rotor easier to levitate within the toroidal cavity by the electrostatic suspension system. The rotor and rotor housing of FIG. 5 operate in exactly the same manner as the rotor and rotor housing shown in the embodiment of FIGS. 1 through 4 of the drawings.

It will be noted that the toroidal cavity 22 in the rotor housing 17 in both embodiments of the invention is not interconnected with the larger cavity 14 in which the force transducers 40 and 41 and the rotor housing 17 itself are disposed. Accordingly, these two cavities may be evacuated separately. Since the toroidal cavity 22 in which the rotor rotates must be evacuated to as high a degree of vacuum as possible to minimize frictional losses and prevent arcing of the suspension electrodes, the small volume of this cavity permits this to be easily done. The larger cavity 14 in which the rotor housing and force transducers are disposed contains a much larger volume of air to be evacuated and the wide diversity of materials utilized for the components disposed in this cavity presents additional problems caused by outgassing. The construction described herein permits these two cavities to be evacuated separately to the required degree of vacuum, so that the toroidal rotor housing cavity 22 can be evacuated to the high degree required for satisfactory rotor operation while the larger cavity 14 need only be evacuated to a degree of vacuum sufficient for proper operation of the vibrating beam force transducers. The higher degree of vacuum possible in the toroidal rotor housing cavity and the novel construction of the rotor of the invention permits the rotor to be brought to full spin speed with little power and therefore minimizes problems arising from thermal dissipation and temperature gradients.

The cylindrical rotor of the invention, unlike the spherical rotor in known electrostatic gyroscopes, may be operated at substantially higher spin speeds without fear of centrifugal distortion of the rotor surface which would introduce error torques in the gyroscope output. Any radial distortion of the cylindrical rotor employed in the present invention can be compensated for by merely increasing the diameter of the toroidal cavity. The maximum rotor spin speed which may be used with the gyroscope of the invention is only limited by the mechanical strength of the rotor. Additionally, the use of a cylindrical rotor, rather than a spherical rotor, permits the use of a less accurate and consequently less complicated and expensive electrostatic suspension system. All the suspension system in the present gyroscope need do is to levitate the rotor in the toroidal cavity of the rotor housing to an extent which permits the rotor to keep spinning. Accordingly, substantial physical distortion of the rotor structure may occur without substantially affecting gyroscope operation. The higher spin speeds made possible with the cylindrical rotor of the invention make possible a higher ratio of angular momentum to weight which means that the weight of the rotor structure which must be supported by the flexure joint may be made quite small to minimize errors due to vibration, shock and acceleration. Consequently, the weight of the rotor structure and rotor housing are supported by the flexure joint rather than the vibrating beam force transducers, so that the accuracy of the gyroscope output is improved.

It is believed apparent that may changes could be made in the construction and described uses of the foregoing electrostatic rate gyroscope and many seemingly different embodiments of the invention could be constructed without departing from the scope thereof. For example, different electrode configurations could be employed and different rotor displacement sensing circuits could be utilized to provide proper rotor suspension. Additionally, the rotor configuration and electrostatic suspension techniques utilized could be used in single axis gyroscopes, directional gyroscopes or other inertial devices. The rotor configuration could also be changed by utilizing outwardly projecting flange means which project away from the spin axis, rather than the inwardly projecting flange means illustrated herein which project toward the spin axis. Accordingly, it is intended that all matter contained in the above description or shown in the accompanying drawings shall be interpreted as illustrative and not in a limiting sense.

What is claimed is:

1. A gyroscope having a spin axis and at least one input axis comprising a rotor housing having a toroidal cavity therein concentrically disposed about said spin axis;

mounting means for mounting said rotor housing to permit rotation thereof about at least one precession axis;

a rotor having a cylindrical body portion with projecting flange means thereon concentrically disposed within said cavity about said spin axis;

electrostatic suspension means for suspending said rotor within said cavity to permit rotor rotation about said spin axis and to prevent relative angular rotation between said housing and said rotor about said one precession axis, so that said housing rotates with said rotor about said precession axis in response to an input rate applied to said input axis; and force transducer means coupled to said housing for exerting a force on said housing to prevent rotation thereof about said precession axis and for producing an output signal in response to said force, whereby said output signal is responsive to said applied input rate.

2. A gyroscope as claimed in claim 1 wherein said force tranducer means comprises vibrating beam force transducer means of the type having at least one resonator beam which produces an electrical output signal having a frequency which is a function of the mechanical stress produced in said resonator beam by the force being sensed.

3. A gyroscope as claimed in claim 2 wherein said toroidal cavity is a sealed evacuable cavity adapted to be evacuated to a high degree of vacuum.

4. A gyroscope as claimed in claim 3 wherein said rotor housing and said vibrating beam force transducer means are disposed within a sealed evacuable casing which is adapted to be evacuated separately from said sealed toroidal cavity.

5. A gyroscope as claimed in claim 4 wherein
said casing is made of a non-electrically conductive and non-magnetic material,
said rotor has at least the surface thereof formed of an electrically conductive material, and
means are mounted exteriorly of said casing for generating a rotating magnetic field within said rotor housing about said spin axis to induce eddy currents in said rotor and produce rotor spin torque.

6. A gyroscope as claimed in claim 1 wherein
at least a portion of the surface areas of sid rotor body portion and flange means comprise electrically conductive material, and
said electrostatic suspension means comprises
displacement sensing means for sensing the displacement of said rotor from a null position within said cavity, and
suspension electrode means responsive to the output of said displacement sensing means for exerting an electrostatic force on said rotor to return said rotor to said null position.

7. A gyroscope as claimed in claim 6 wherein said suspension electrode means comprise suspension electrodes disposed on the walls of said rotor housing defining said cavity.

8. A gyroscope as claimed in claim 7 wherein said suspension electrodes comprise
a first set of radially disposed suspension electrodes located on the housing cavity wall adjacent one side of said rotor flange means,
a second set of radially disposed suspension electrodes located on the housing cavity wall adjacent the other side of said rotor flange means in radial alignment with the electrodes of said first set, so that the electrodes of said second set cooperate with the electrodes of said first set to form radially disposed electrode pairs which control translatory movement of said rotor along said spin axis and relative angular rotation between said housing and said rotor about two perpendicular axes which are each perpendicular to said spin axis, and
a third set of radially disposed suspension electrodes located on the housing cavity wall adjacent said rotor body portion, the electrodes of said third set cooperating with each other to form radially disposed electrode pairs with the electrodes of each such pair being located on diametrically opposite sides of said rotor, so that said third set of electrodes controls translatory movement of said rotor along said two perpendicular axes.

9. A gyroscope as claimed in claim 8 wherein said displacement sensing means comprise a separate rotor displacement sensing circuit for each of said radially disposed electrode pairs, said rotor displacement sensing circuit comprising
a capacitance bridge detector circuit having two of the arms thereof formed by the capacitances between said rotor and the pair of suspension electrodes associated with the sensing circuit,
means for coupling said bridge circuit to an alternating current source for energization thereby, so that the output of said bridge circuit is an amplitude modulated alternating current signal having an amplitude and phase respectively representing the magnitude and direction of the rotor displacement from said null position with respect to said associated pair of suspension electrodes, and
detector demodulator circuit means having an input coupled to the output of said bridge circuit and an output coupled across said associated pair of suspension electroes for demodulating said bridge circuit output signal to produce a direct current control signal for said associated electrode pair having a magnitude and polarity to return the rotor to said null position.

10. A gyroscope as claimed in claim 1 wherein said rotor flange means comprise first and second annular flanges projecting from opposite ends of said rotor body portion, each of said flange means being substantially perpendicular to said rotor body portion so that said rotor has a substantially C-shaped cross-sectional area.

11. A gyroscope as claimed in claim 10 wherein said toroidal cavity has a substantially rectangular cross-sectional area.

12. A gyroscope as claimed in claim 1 wherein said rotor flange means comprises an annular flange projecting from the central portion of said rotor body portion, said flange being substantially perpendicular to said rotor body portion so that said rotor has a substantially T-shaped cross-sectional area.

13. A gyroscope as claimed in claim 12 wherein said toroidal cavity has a substantially T-shaped cross-sectional area.

14. A gyroscope as claimed in claim 1 wherein
said mounting means comprises a support rod extending along said spin axis and having a necked-down portion of gradually decreasing circular cross-sectional area to form a flexure joint hving two degrees of rotational freedom about axes perpendicular to said spin axis,
said rotor housing is fixedly mounted on one end of said support rod, and
the center-of-gravity of said rotor housing and rotor lies in said flexure joint. formed of an electrically conductive material, and
means are mounted exteriorly of said casing for generating a rotating magnetic field within said rotor housing about said spin axis to induce eddy currents in said rotor and produce rotor spin torque.

15. A gyroscope having a spin axis and two input axes comprising
a rotor housing having a sealed evacuable toroidal cavity therein;
means for mounting the rotor housing with said cavity concentrically disposed about the spin axis and oriented in the plane defined by said input axes, said mounting means having two degrees of freedom to permit rotation of said housing about both of the gyroscope precession axes;
a rotor having a cylindrical body portion concentrically disposed within said cavity about the spin axis and annular flange means projecting from said body portion, said flange means being substantially perpendicular to said body portion;

electrostatic suspension means comprising a plurality of suspension electrodes disposed on the walls of said cavity adjacent said rotor body portion and flange means for suspending said rotor within said cavity to permit rotor rotation about said spin axis and prevent relative angular rotation between said housing and said rotor about said precession axes, so that the housing rotates with the rotor about said precession axes in response to input rates applied to said input axes; and vibrating beam force transducer means connected to said housing for exerting a restraining force thereon to prevent housing rotation about said precession axes, said transducer means being of the type having at least one resonator beam which produces an electrical output signal having a frequency which is a function of the mechanical stress produced in the beam by the reaction force exerted by the transducer means.

16. A gyroscope as claimed in claim 15 wherein said rotor housing comprises a wheel-like structure having
- a central hub portion connected to said mounting means for support thereby,
- an annular rim portion concentrically disposed about said hub portion and containing said toroidal cavity, and
- a plurality of support arms interconnecting said rim portion and said hub portion.

* * * * *